United States Patent [19]
Ninomiya et al.

[11] Patent Number: 4,745,459
[45] Date of Patent: May 17, 1988

[54] DIVISIONALLY TIME-COMPRESSED SUBSAMPLE TRANSMISSION AND MOTION-COMPENSATED REPRODUCTION SYSTEM FOR A HIGH DEFINITION COLOR TELEVISION PICTURE SIGNAL

[75] Inventors: Yuichi Ninomiya; Yoshimichi Ohtsuka; Yoshinori Izumi, all of Tokyo, Japan

[73] Assignee: Nippon Hoso Kyokai, Japan

[21] Appl. No.: 33,878

[22] Filed: Apr. 2, 1987

Related U.S. Application Data

[63] Continuation of Ser. No. 659,404, Oct. 10, 1984, abandoned.

[30] Foreign Application Priority Data

| Oct. 19, 1983 | [JP] | Japan | 58-194115 |
| Oct. 19, 1983 | [JP] | Japan | 58-160530 |
| Jan. 24, 1984 | [JP] | Japan | 59-9397 |
| Feb. 6, 1984 | [JP] | Japan | 59-18418 |

[51] Int. Cl.[4] .................... H04N 7/12; H04N 11/02
[52] U.S. Cl. .................................. 358/12; 358/138
[58] Field of Search .............. 358/12, 13, 133, 138, 358/141, 105, 14

[56] References Cited

U.S. PATENT DOCUMENTS

| 2,810,780 | 10/1957 | Loughlin | 358/12 |
| 2,921,124 | 1/1960 | Graham | 358/138 |
| 3,136,847 | 6/1964 | Brown | 358/133 |
| 3,715,483 | 2/1973 | Limb et al. | 358/133 |
| 4,168,509 | 9/1979 | Hartmann | 358/138 |
| 4,307,420 | 12/1981 | Ninomiya et al. | 358/105 |
| 4,485,401 | 11/1984 | Tan et al. | 358/12 |
| 4,521,803 | 6/1985 | Gittinger | 358/141 |
| 4,530,004 | 7/1985 | Achiha et al. | 358/11 |
| 4,531,151 | 7/1985 | Hentschke | 358/138 |
| 4,605,963 | 8/1986 | Reitmeier et al. | 358/13 |

FOREIGN PATENT DOCUMENTS

| 102180 | 8/1981 | Japan | 358/13 |

OTHER PUBLICATIONS

Broder Wendland, High Quality Television by Signal Processing, 2nd International Conference on New Systems and Services in Telecommunications, Liege, Nov. 1983.
Dill, High Resolution NTSC Television System, IBM Technical Disclosure Bulletin, vol. 21, No. 5, Oct. 1978, pp. 2148-2153.
Robson, A Compatible High Fidelity TV Standard for Satellite Broadcasting, 16 Annual SMPTE Television Conference—Tomorrow's Television—Feb. 1982, pp. 218-236.
"Sampling and Reconstruction of NTSC Video Signals at Twice the Color Subcarrier Frequency"; Jean-Yves Ouellet & Eric DuBois, 1981 IEEE, pp. 1823-1832, 13th Int. TV Symposium Montreux, 28 May-2, Jun. 1983, pp. 71-79.
"A Motion-Compensated Interframe Coding Scheme for Television Pictures"; Yuichi Ninomiya & Yoshimichi Ohtsuka; 1982 IEEE, pp. 201-211.
"High-Definition Wide-Screen Television System for the Future"; Takashi Fujio; 1980 IEEE, pp. 114-124.

*Primary Examiner*—John W. Shepperd
*Attorney, Agent, or Firm*—Parkhurst & Oliff

[57] ABSTRACT

A high definition color television picture signal is unified by time-axis compressed integration (TCI) and the bandwidth thereof is extremely narrowed by dot-interlace subsampling. As a result, a narrow band transmission picture signal accompanied with a control signal adapted to the restoration of the received original picture signal, which is suitable for satellite broadcast, can be obtained through a comparatively simple arrangement. The received narrow band transmission picture signal can be restored by the interpolation adapted respectively to the stationary picture and the motion picture under control of the control signal or the picture-motional information detected from the received picture signal in combination with the control signal, so that the original high definition can be sufficiently maintained through comparatively simple receiving equipment.

9 Claims, 14 Drawing Sheets

○, □ FIRST FRAME (I)
●, ■ SECOND FRAME (II)
×, + SKIPPED

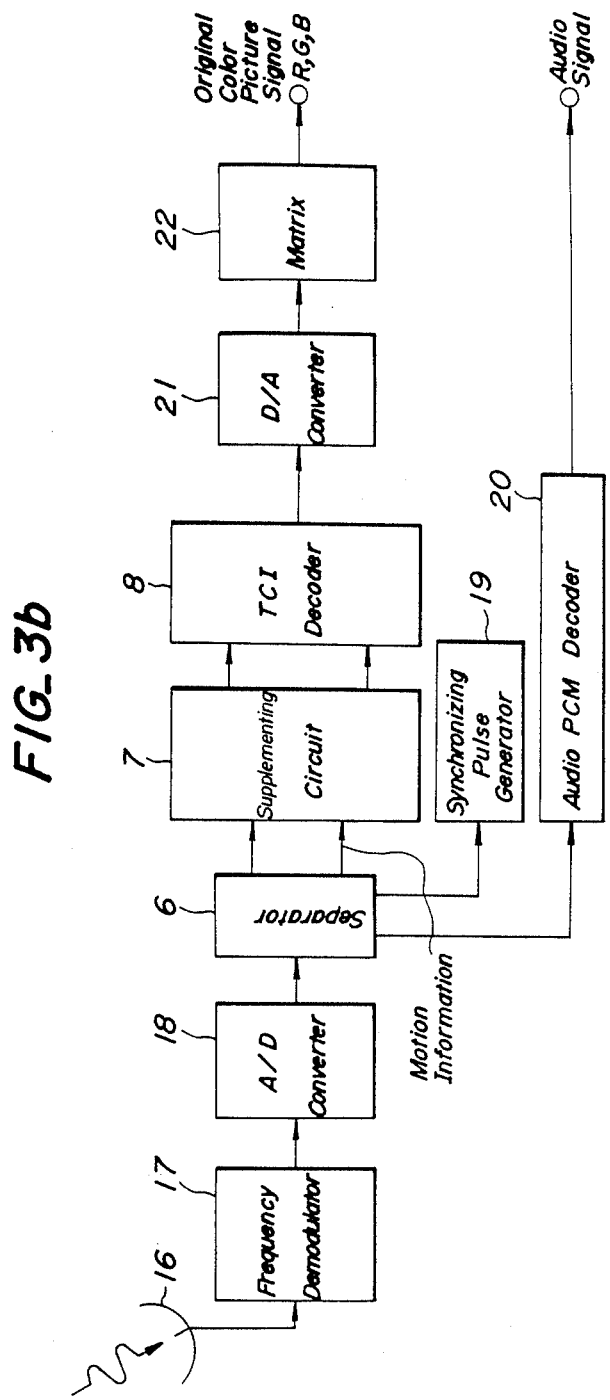

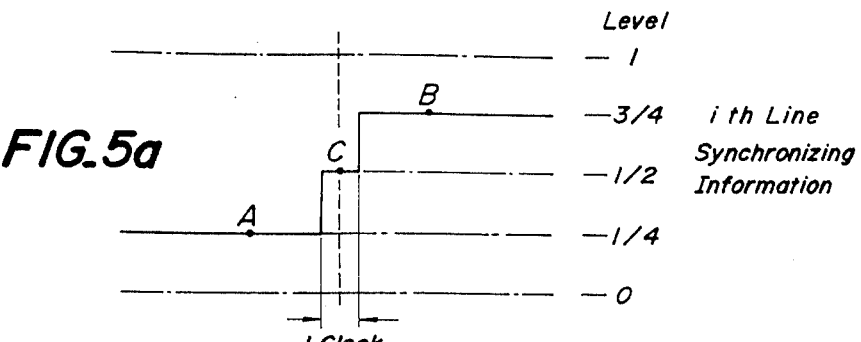
FIG. 5a — i th Line Synchronizing Information
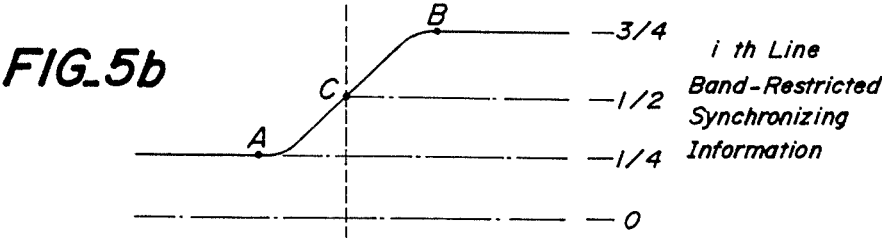
FIG. 5b — i th Line Band-Restricted Synchronizing Information
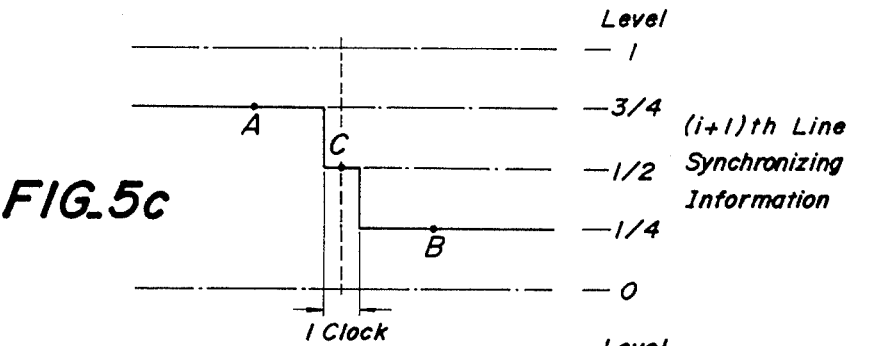
FIG. 5c — (i+1)th Line Synchronizing Information
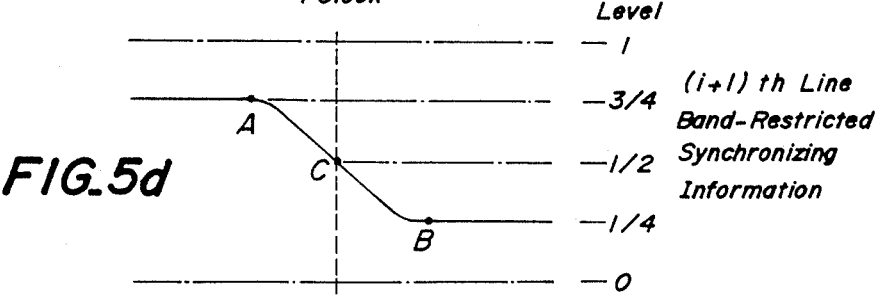
FIG. 5d — (i+1)th Line Band-Restricted Synchronizing Information

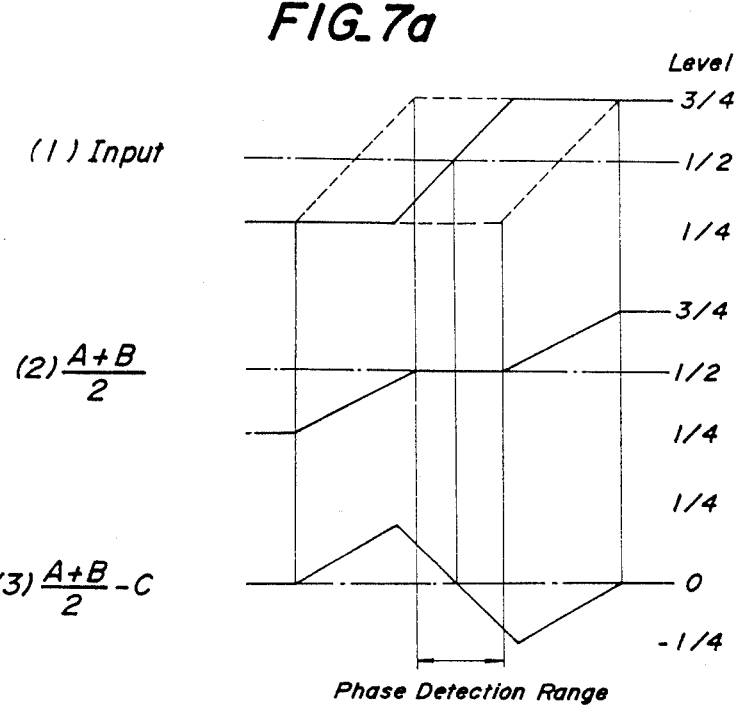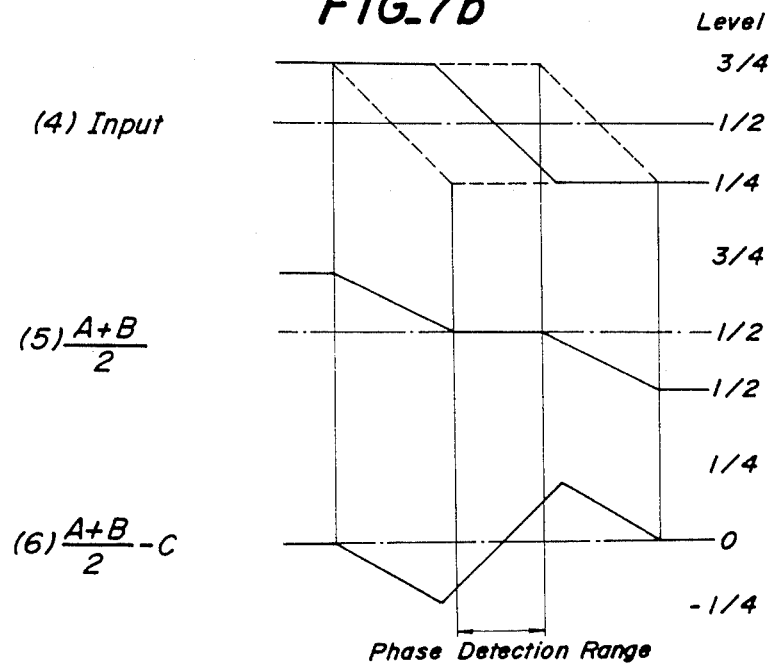

FIG_9
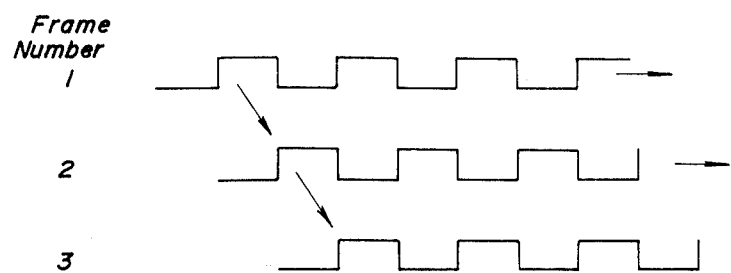
FIG_10
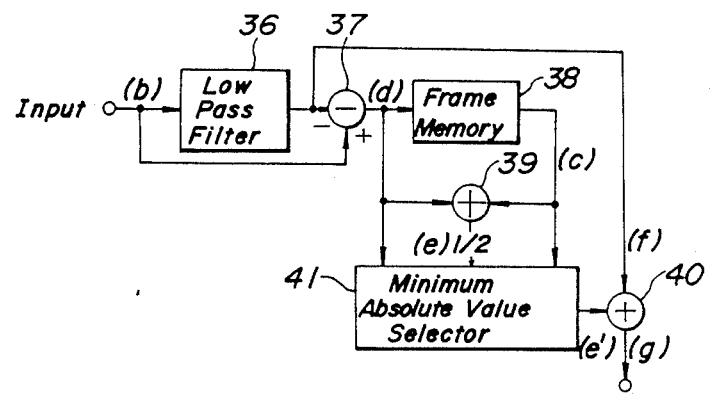

FIG_11a 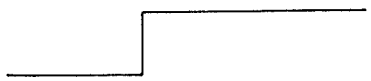
FIG_11b 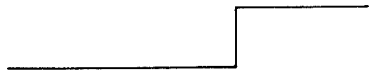
FIG_11c 
FIG_11d 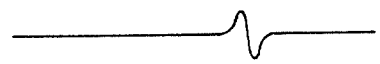
FIG_11e 
FIG_11e' 
FIG_11f 
FIG_12
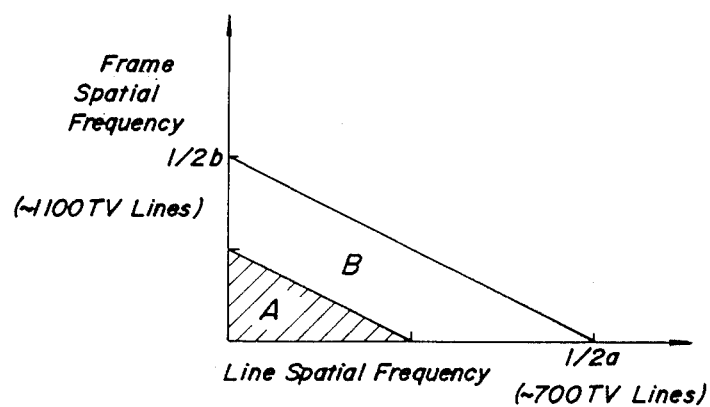

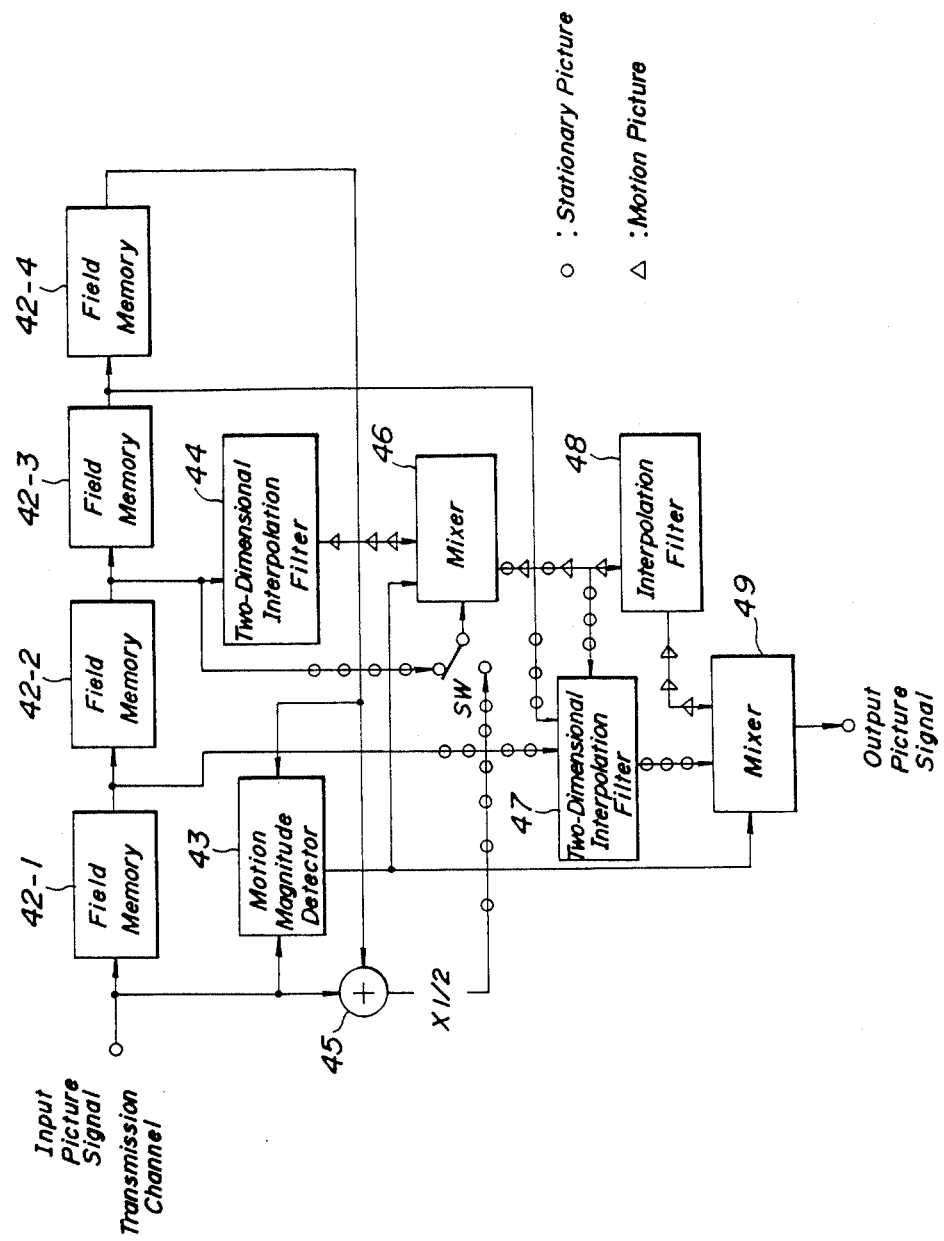

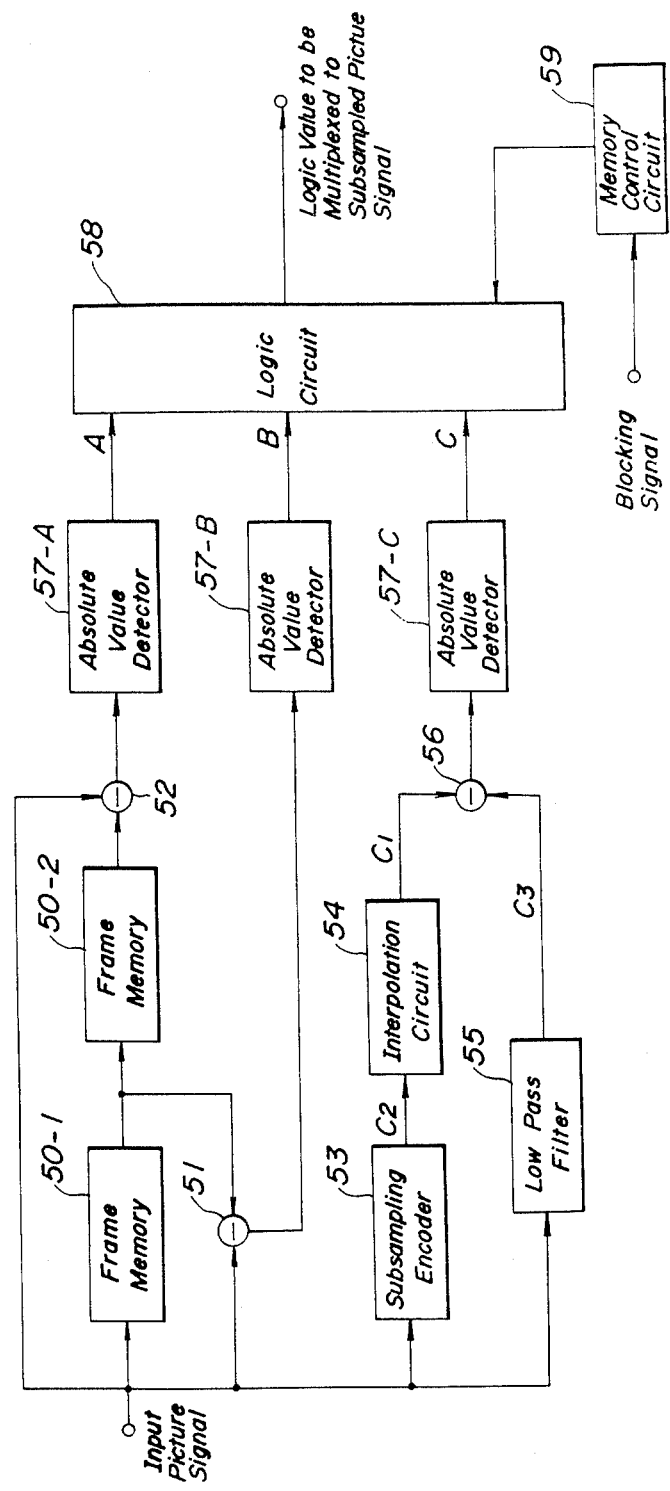

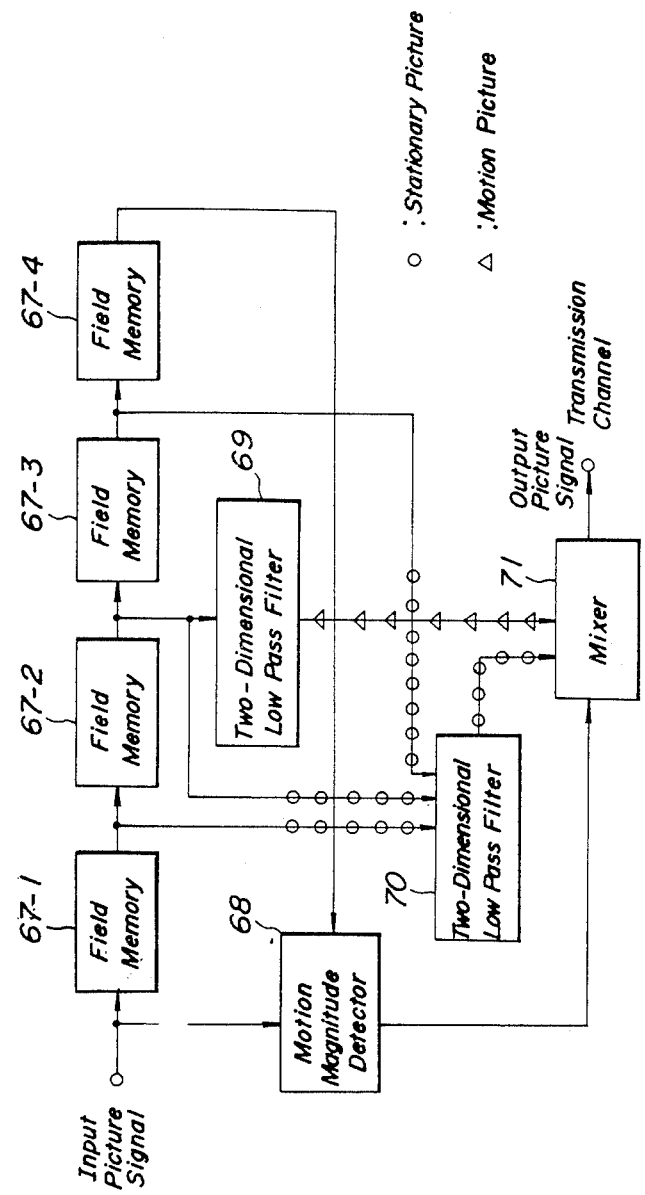

DIVISIONALLY TIME-COMPRESSED SUBSAMPLE TRANSMISSION AND MOTION-COMPENSATED REPRODUCTION SYSTEM FOR A HIGH DEFINITION COLOR TELEVISION PICTURE SIGNAL

This is a continuation of application Ser. No. 659,404 filed Oct. 10, 1984, now abandoned.

BACKGROUND OF THE INVENTION (1) Field of the Invention:

The present invention relates to a divisionally time-compressed subsampling transmission and motion compensated reproduction system for a wide-band high definition color television picture signal. The system sends narrow band transmission conditioned at a sending end and restores the original form at a receiving end under the most suitable processing adapted to the conditioning, particularly the most suitable interpolation adapted to the subsampling at the sending end, so as to maintain high definition at the receiving end.

(2) Description of the Prior Art:

The standard of the high definition color television picture signal of this kind has not yet been unified into an international one, but the following standards are in the course of investigation.

Number of scanning lines: 1,125
Aspect ratio: 5:3
Interlace ratio: 2:1
Field frequency: 60 Hz
Video signal frequency band:
Luminance signal bandwidth: 20 MHz
Wide-band chrominance signal bandwidth: 7.0 MHz
Narrow-band chrominance signal bandwidth: 5.5 MHz As is apparent from the above, even only with respect to the luminance signal bandwidth, a high definition television system requires an extremely wide-band transmission signal, about five times that of the present standard television system. Fruther, the signal is accompanied with two kinds of chrominance signals. Therefore, plural narrow transmission channels are required for the transmission of single channel of the high definition television system.

As an example of a transmission channel which is not perfectly suitable but substantially adapted to the transmission of the high definition television system, particularly to the broadcast thereof, a satellite broadcast channel is worthy of note. In this connection, the bandwidth per channel in the 12 GHz band, which is alloted to the third zone including Japan for broadcast business use, is 27 MHz as decided in 1979 at the World Administration Radio Conference on Broadcast Satellite.

The satellite channel is best suited for transmission by frequency modulation systems capable of obtaining a wide band and high gain. This is because it is an analog transmission channel and is restricted in sending power. For instance, the above-mentioned bandwidth per channel of 27 MHz allotted for broadcast business can transmit a signal having a base band of only one third thereof. Accordingly, a high definition television picture signal can be transmitted at one time by employing four or five channels of the broadcast satellite transmission. However, realization thereof is regarded as extremely difficult due to the inefficient utilization of the transmission channel.

To efficiently use the transmission channel, it is most desirable that the high definition color television picture signal be transmitted through a signal channel of the broadcast satellite transmission. Therefore, unification of the high definition color television picture signal consisting of luminance signal components and chrominance signal components and drastically compressing the extremely wide frequency band thereof is required.

The above required unification and band compression will be described hereinafter.

As mentioned above, the broadcast satellite transmission is best adapted to a frequency modulation system. However, frequency modulation transmission is accompanied with so-called triangular noise, the power of which increases proportional to the frequency. Therefore, for transmission of a wide band signal unified by frequency multiplexing, such as the color television signal of the NTSC system of the HLO-PAL system, frequency modulation is unfavorable because of noise and crosstalk.

On the other hand, the time compressed integration system, that is, the co-called TCI system, for example the MAC system of the European Broadcast Union, is regarded as suited to frequency modulation transmission. In this TCI system, wide-band and narrow-band chrominance signals $C_W$ and $C_N$, time axes of which are respectively compressed, are multiplexed with a luminance signal Y, for instance, by being inserted into a line retracing period thereof, so as to obtain a unified color television picture signal.

As is apparent from the above, in the NSC system or the HLO-PAL system, a composite color television picture signal is obtained by frequency-multiplexing the chrominance signals with the luminance signal, while, in the TCI system, a kind of analog component color television picture can be obtained. Thus, the unified color television picture signal of this TCI system is free from the problems of crosstalk between the chrominance signals and the luminance signal, and the differential gain or the differential phase of the NTSC system is not affected by the nonlinear performance of the transmission channel. Consequently, the TCI system can be regarded as adaptible to transmission of frequency modulation. In this regard the bandwidth of the TCI signal is widened after compression of time axes thereof in spite of the unification.

Regarding frequency band compression of satellite transmission of high definition color television picture signals, among various systems worthy of investigation, the so-called subsampling system can be adapted for a band compression system capable of drastic compression, for instance, into one twentieth. This subsampling system can be regarded as a two-dimensional dot-interlace scanning system in which a specified element in a television picture is scanned once, for instance, every four field periods. Thus, a stationary television picture signal can be completely transmitted every four field periods with a compressed bandwidth of one fourth of the original bandwidth. The subsampling system seems to be promising for drastic compression of the bandwidth.

However, this subsampling system has the following problems. In the subsampling system, as mentioned above, a specified element in a television picture is scanned once every four field periods, so that a high degree of interpolation of skipped picture elements is required for the restoration of the original television picture every field period.

First, with regard to a motion picture region and a quasi-stationary picture region resulting from the panning of a television camera, interpolation of picture elements must be adapted for each picture.

Second, even with a stationary picture region, interpolation of skipped picture elements is required at exact timings of each of every four field periods.

SUMMARY OF THE INVENTION

An object of the present invention is to provide a high grade transmission system in which a high definition color television picture signal having an extremely wide base band can be transmitted through a single narrow transmission channel, particularly a broadcast satellite channel having an ordinary narrow bandwidth. The compressed band can be restored into the original color television picture signal with high definition maintained through suitable processing respectively adapted to various picture content.

Another object of the present invention is to provide a multiplex subsampling transmission system for a high definition color television picture signal which is configured by combining the time compressed integration (TCI) system for effecting the unification of frequency modulation transmission, and the subsampling system for effecting the drastic band compression.

Still another object of the present invention is to provide a multiplex subsampling transmission and motion compensated reproduction system for a high definition color television picture signal in which a picture signal for narrow band transmission, arranged by subsampling the original picture signal, is restored by the most suitable interpolation respectively adapted to the stationary picture region, the quasi-stationary picture region and the motion picture region of the picture expressed by the original picture signal, effected at the most exact timing.

Another object of the present invention is to provide a multiplexed subsampling transmission and motion compensated reproduction system for a high definition color television picture signal in which system the restoration of the high definition signal from the narrow band transmission picture signal conditioned by subsampling is suitably effected under control of a color signal transmitted together with the narrow band transmission picture signal.

A feature of the multiplex subsampling transmission and motion compensated reproduction system for a high definition color television picture signal according to the present invention is that a luminance signal and two kinds of chrominance signals are unified by the TCI system adapted to FM transmission with a narrow bandwidth compressed by a subsampling system capable of drastic band compression, and that the narrow-band transmission picture signal is restored into the original high definition color television picture signal through interpolation effected under the control of a control signal transmitted together with the narrow-band transmission picture signal with exact timing.

Another feature of the transmission system according to the present invention is that the control signal transmitted together with the narrow-band transmission picture signal comprises a signal carrying information on motion expressed by the high definition color television picture signal, for example, information on a magnitude of the motion or on a motion vector indicating the motion.

Yet another feature of the transmission and reproduction system according to the present invention is that under the control of the signal carrying information on the motion of the picture, both of the narrow-band transmission signals supplemented by in field interpolation and interframe interpolation, respectively, are mixed with each other at a ratio corresponding to information of the magnitude of the motion which is carried by the control signal transmitted together with the narrow-band transmission picture signal, so as to perform signal processing respectively adapted to the stationary picture and the motion picture.

Another feature of the transmission and reproduction system according to the present invention is that under the control of the signal carrying information on the motion vector detected from the high definition color television picture signal, the narrow-band transmission picture signal is motion-compensated with regard to the quasi-stationary picture region thereof.

Another feature of the transmission and reproduction system according to the present invention is that the control signal transmitted together with the narrow-band transmission picture signal comprises a line synchronizing signal having a sequence of stepwise signal levels of the same polarity as a picture information signal, a sense of which is reversed every other line period. Thus, the narrow-band transmission picture signal is supplemented by interpolation of skipped samples, which is effected at exact timing locking in phase with the stabilized line synchronizing pulse.

It is yet another feature of the transmission and reproduction system according to the present invention that line synchronizing signals specially provided for the high definition color television picture signal are transmitted together with the narrow-band transmission picture signal as the control signal for securing stable phase-lock of picture signals necessitated at the receiving end. In addition, the most suitable motion-compensated interpolation for the quasi-stationary picture signal is effected by employing the sum of the lower frequency components and the signal having the minimum absolute value between the higher frequency components and those one-frame-delayed, all of which components are separated from the received narrow-band transmission picture signal.

The transmission and reproduction system according to the present invention is further featured in that under the control of the stabilized line synchronizing pulse, the narrow-band transmission picture signal is supplemented by adding output signals of two kinds of two-dimensional low pass filters respectively filtering motion picture content and stationary picture content of the narrow-band transmission picture signal to each other at a ratio varied in proportion to the magnitude of the motion detected from the narrow-band transmission picture signal.

Another feature of the transmission and reproduction system according to the present invention is that the control signal transmitted together with the narrow-band transmission picture signal carries control information indicating the detection of the motion of the picture expressed by the narrow-band transmission picture signal based on a difference between either every other frame or adjacent frames thereof, and the narrow-band transmission picture signal is suitably processed under correct discrimination of the motion picture region and the stationary picture region on the basis of the transmitted control information.

Yet another feature of the transmission and reproduction system according to the present invention is that the bandwidth of the high definition color television picture signal is restricted prior to conversion to the narrow-band transmission picture signal through two dimensional low pass filters respectively adapted to the motion picture and the stationary picture, so as to suppress the generation of aliasing components caused by the subsampling process.

BRIEF DESCRIPTION OF THE DRAWINGS

For better understanding of the invention, reference is made to the accompanying drawings, in which:

FIGS. 3(a) and 3(b) are block diagrams showing examples of fundamental configurations of a sending and a receiving circuit respectively;

FIGS. 5(a) to 5(d) are diagrams showing examples of the line synchronizing signal according to the present invention;

FIGS. 7(a) and 7(b) are diagrams showing examples of signal waveforms detected by a line synchronizing signal phase detector of FIG. 6;

FIG. 9 is a diagram showing an example of signal waveforms having inter-two-frame correlation with each other;

FIG. 10 is a block diagram showing an example of a circuit configuration of a temporal interpolation arrangement;

FIGS. 11(a) to 11(f) are diagrams successively showing signal waveforms at various portions of the circuit of FIG. 10;

FIG. 12 is a diagram showing an example of a spatio-temporal frequency response of a two-dimensional low pass filter of a transmission and reproduction system according to the present invention;

FIG. 13 is a block diagram showing sample example of a circuit configuration of an arrangement at a receiving end of the transmission and reproduction system according to the present invention;

FIG. 14 is a block diagram showing an example of a motion detector which can be used in the sending ends shown in FIGS. 3a and 16 of the present invention;

FIG. 16 is a block diagram showing another example of the arrangement at the sending end of the present invention.

Description of the Preferred Embodiments

First, outlines of two kinds of narrow band picture signal transmission systems applied in multiplex to the transmission of the high definition color television picture signal in the multiplex subsampling transmission system according to the present invention will be described.

Figure 1:
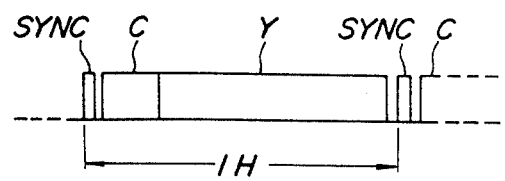
FIG. 1 is a diagram showing a configuration of a transmission signal of the time axis compressed divisional multiplex transmission (TCI) system.

In the time-axis compressed integration (TCI) transmission system, a luminance signal Y and a chrominance signal C in a color television picture signal formed, for instance, by applying primary color picture signals derived from a color television camera to a color encoder, are processed by compressing time axes of at least the chrominance signal C at a suitable ratio. Thereafter, these signals Y and C are multiplexed in time division with each other between line synchronizing signals SYNC a line scanning periods as shown in FIG. 1. According to this time-division multiplexing, respective time durations of the transmission of the luminance signal Y and the chrominance signal C are shifted from each other, so that interference between the luminance signal Y and the chrominance signal C, which is caused by conventional narrow band transmission of mutually frequency-multiplexed luminance and chrominance signals, can be avoided. The bandwidth of the transmitted signal is somewhat increased by the time-axis compression. As a result, narrow-band transmission with favorable picture quality can be realized.

Figure 2:
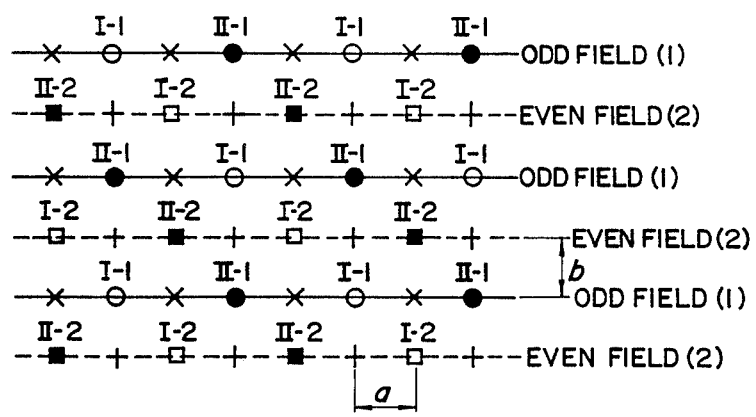
FIG. 2 is a diagram schematically showing an example of a subsampling pattern.

In the subsampling transmission system, sample values of the picture expressed by the picture signal are transmitted. These sample values are obtained by offset sampling of the picture signal. In other words, sample positions of picture elements within a line are subsampled from one picture frame and are offset from each other between each field thereof in a sampling pattern as shown in FIG. 2. Each picture element is not transmitted through the system, but thinning-out is effected once every plural frames in a predetermined order at the sending end. Sample values skipped by thinning-out at the sending end are supplemented by interpolation at the receiving end, so as to restore the original picture at every frame period. For instance, as shown by the four groups of samples indicated with filled and unfilled circles and filled and unfilled squares in FIG. 2, sample values thinned-out from four field periods are transmitted in a single field period, so as to complete a picture every four frame periods. Accordingly, the amount of information to be transmitted every field period can be reduced into one-eighth of the original amount. Thus, drastically narrowed band transmission can be effected.

However, except for a stationary picture which can be restored by putting sample values transmitted after thinning out at every field period against each other without supplementation, various proposals have been made for supplementing sample values thinned-out from a moving picture in which sample values of the same picture element are varied every frame.

In the transmission system according to the present invention, a high definition color television picture signal having an extremely wide frequency band can be transmitted after being extremely narrowed through a comparatively simple circuit arrangement which uniquely combines the TCI system with the subsampling system.

More particularly, in the multiplex subsampling transmission and reproduction system for a high definition color television picture signal according to the present invention, respectively sampled luminance and chrominance signals are unified through the TCI system, and thereafter are conditioned with in field or interframe subsampling together with the motion information to be transmitted for controlling the supplementary processing in response to the motion of the picture.

This provides a narrow-band transmission signal on an FM transmitting carrier at the sending end. The received narrow-band transmission signal is separated into the picture signal and the motion information, the former being processed by motion compensation and interpolation of the skipped samples under the control of the motion information and thereafter further separated into a luminance signal and a chrominance signal through a TCI decoder, so as to restore the original high definition color television picture signal.

Figure 3A:
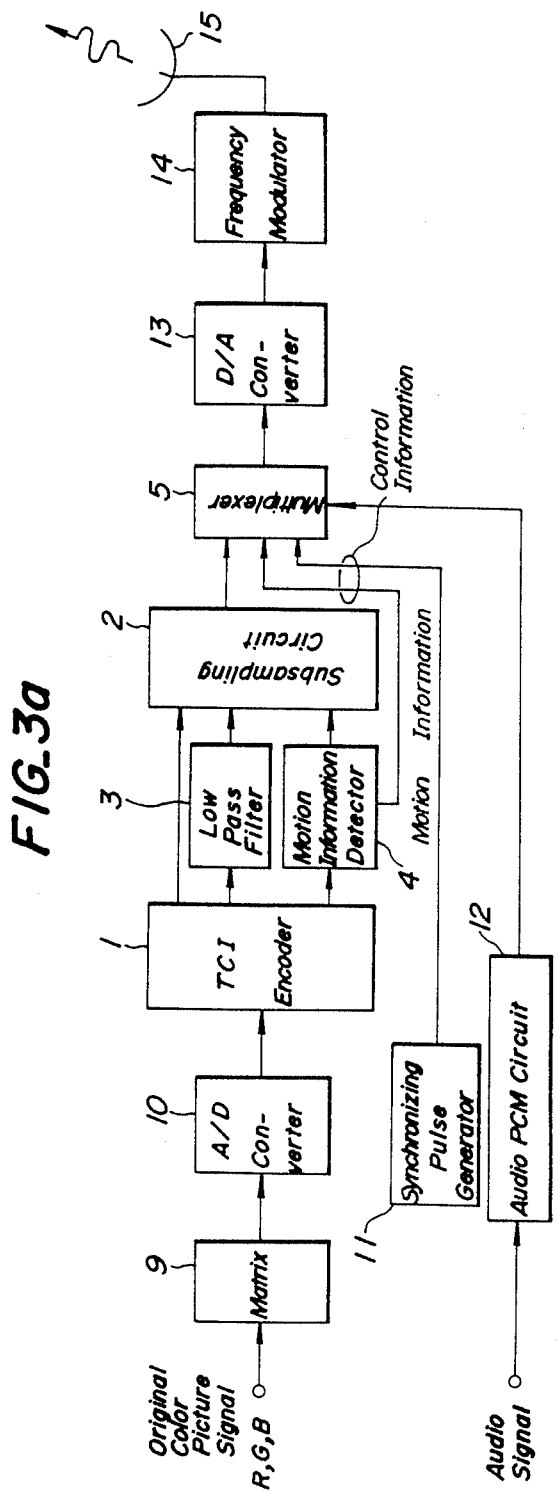

In a fundamental configuration of the sending end arrangement as shown in FIG. 3(a), the luminance signal Y and the chrominance signal C constituting the high definition color television signal, are conditioned with time-axis compression and multiplexed in time-division form as shown in FIG. 1 through a TCI encoder 1, so as to obtain a TCI signal.

This TCI signal is directly applied to a subsampling cricuit 2, and lower frequency components thereof, obtained through a low pass filter 3, are applied to the same. In addition, motion information, including a picture motion vector expressed by the TCI signal, which is detected, for instance, from an interframe differential signal through a motion information detector 4 applied with the TCI signal, is also applied to the subsampling circuit 2. In this subsampling circuit 2, the TCI signal is processed through subsampling every four field periods as shown in FIG. 2. The subsampled TCI signal is applied to a multiplexer 5 together with the motion information derived from the motion information detector 4 and a line synchronizing signal generated from a synchronizing signal generator 11 as a control signal, so as to obtain a subsampled narrow-band transmission signal. These control signals are multiplexed, for example, by insertion into the vertical or horizontal blanking periods as is well known in the art.

In a fundamental configuration of the receiving end arangement as shown in FIG. 3(b), the above subsampled narrowband transmission signal received through a transmission channel is separated into the subsampling picture TCI signal and the motion information through a separator 6, which are applied together to a supplementing circuit 7. In this supplementing circuit 7, subsampled stationary picture signals every four field periods are successively assembled with each other, so as to restore the original TCI signal, while subsampled motion picture signal is supplemented every field period by interpolation within the same field, so as to approximately restore the original TCI signal. Thereafter, this restored TCI signal is separated into the luminance signal Y and the chrominance signal C through a TCI decoder 8. Previously compressed time-axes of at least the signal C among these separated signals Y and C are expanded respectively, so as to restore the original luminance and the original chrominance signals Y and C, from which the original high definition color television picture signal is restored.

In addition, the control signal separated from the received narrow-band transmission signal through the separator 6 is applied to a synchronizing pulse generator 19 so as to generate a line synchronizing pulse for driving the receiving end arrangement. The control signal is also applied to the subsampling circuit 7, so as to effect the most favorable interpolation adapted respectively to the stationary picture region and the motion picture region of the picture in the narrow-band transmission picture signal.

As is apparent from the above, two different kinds of narrow band transmission systems, the TCI system and the subsampling system, are applied to the wide-band high-definition color television picture signal without interference therebetween and with suitable combination thereof, so that extremely narrow band transmission of the high definition color television picture signal can be realized by drastically compressing the bandwidth to about one third of the original bandwidth with regard to both digital and analog transmissions.

In addition, the above mentioned narrow band transmission picture signal is accompanied with a stabilized line synchronizing signal, a motion information and the like as a control signal for controlling the restoration of the received narrow band transmission picture signal into the original high definition color televison picture signal. Thus, interpolation respectively adapted to the stationary, the quasi-stationary and the motion picture can be performed at the most suitable and exact timing.

Visual perception is generally more tolerant of ambiguity of a motion picture than of ambiguity of a stationary picture. Therefore, in transmission of the usual television picture, the motion of which is slow, the ambiguity contained in the motion picture is not so noticeable, and hence it is not objectionable in practice. However, with regard to the quasi-stationary picture region in which the picture signal derived from the television camera is varied from the stationary picture region to the slowly moving picture region, for instance, in a situation where the camera is slowly panned, ambiguity in the slowly moving picture is distinctly noticeable in comparison with the immediately preceding stationary picture, and hence cannot be tolerated.

To deal with the above mentioned difficulty, the motion information on a motion vector detected from the high definition color television picture signal is transmitted together with the narrow band transmission picture signal as the aforesaid control signa. The interpolation at the receiving end is motion-compensated on the basis of the received motion information.

In the subsampling transmission system for the high definition color television picture signal, all of the sampled elements required for constituting the stationary picture are transmitted, for example, every four field periods. Accordingly, with regard to the stationary picture region of the received picture, temporal interpolation which is completed by gathering all samples transmitted every four field periods, that is, interframe interpolation is employed.

On the other hand, with regard to the motion picture region of the received picture, spatial interpolation which is completed within every field period, that is, in field interpolation is employed.

Accordingly, it is required at the receiving end to selectively employ either of the above mentioned interpolations to discriminate the stationary and the motional picture regions of the received picture.

At the sending end of the transmission system according to the present invention, the motion vector is detected from the TCI picture signal every field period. In addition, the magnitude of the motion is detected from the TCI picture signal at each block dividing the picture. Thereafter, the motion information consisting of the motion vector and the magnitude of the motion is multiplexed with the subsampled narrow band transmission picture signal.

At the receiving end of the transmission and reproduction system according to the present invention, the motion compensation is effected on the quasi-stationary picture region of the received picture on the basis of the received motion vector. Also, suitable interpolation adapted to the motion and the stationary picture regions of the received picture is effected on the basis of the received magnitude of the motion.

In addition, at the receiving end of the transmission and reproduction system according to the present invention, the narrow-band transmission picture signal can be supplemented by interframe interpolation adapted to the stationary picture region and also supplemented by infield interpolation adapted to the motion picture region, mixed at a ratio varied in response to the received motion information, so as to effect suitable processing adapted respectively to the stationary and the motion picture regions.

As a result of the transmission of the motion information together with the narrow band transmission picture signal, the arrangement at the receiving end of the transmission system according to the present invention can be remarkably simplified. Thus, a tremendous impact can be expected for the high definition satellite broadcasting system which is developed for the general public.

Meanwhile, the picture-motion information detector is configured as follows, so as to accurately detect the magnitude of the picture motion. In the situation where the picture motion is detected on the basis of the correlation of the picture signal between two adjacent frames, the magnitude of the interframe difference between frames does not indicate the magnitude of the picture motion as is. However, if the motion exists in the edge portion containing a large amount of higher frequency component of the picture signal, a large interframe difference between adjacent frames appears in this moving edge portion. Therefore, in the motion magnitude detector for the interpolation according to the present invention, accurate detection of the picture motion is not performed only on the basis of the magnitude of the interframe difference, but also performed with consideration of the in frame picture element difference. In other words, the magnitude of the difference between two picture elements within the same frame, namely, the absolute value of the magnitude of the higher frequency component of the picture signal, is used to calculate in frame difference. At the receiving end, the received narrow band transmission signal is separated into the narrow band picture signal and the information indicating the magnitude of the picture motion.

In connection with the motion vector information, the present frame picture signal and the one frame delayed picture signal, which are commonly converted into the TCI picture signal, are shifted every field period with regard to each of those divided blocks. Hence the direction and the magnitude of the shift by which the difference between these picture signals becomes minimum are transmitted as the information of the motion vector under multiplexing with the narrow band picture signal at the sending end.

In this connection, the method for detecting this motion vector information indicating the direction and magnitude of picture motion is disclosed in detail in U.S. Pat. No. 4,307,420 entitled "Motion-Compensated Interframe Coding System" and invented by the present inventors.

At the receiving end, the information of the motion vector is separated from the narrow band picture signal. The narrow band picture signal is processed by motion compensation. For example, after being memorized in a frame memory, this picture signal is read out with temporal shift given on the basis of the separated information of the motion vector.

As is apparent from the above, according to the present invention, even if the subsampled transmission picture signal is a motion picture signal, the subsampling technique such as frame offset sampling, can be effectively applied to the motion picture signal. Further, the interframe skipped samples are supplemented by the interpolation.

As a result, the deterioration of the reproduced picture quality which is caused, for instance, by so-called two line ambiguity, can be obviated and hence the motion picture signal can be effectively transmitted under subsampling with remarkable effect.

Figure 4:
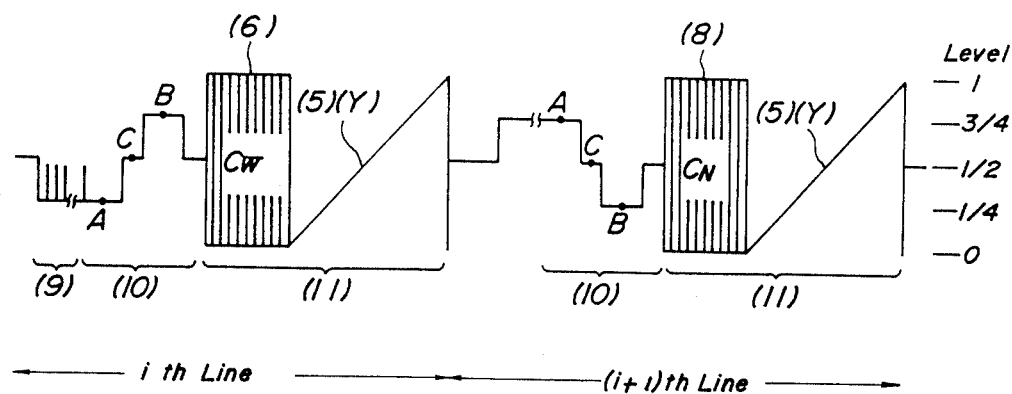
FIG. 4 is a diagram showing an example of a configuration between a picture signal and a line synchronizing signal of the present invention.

A line synchronizing signal prepared according to the present invention and a picture signal are combined as shown in FIG. 4 and this line synchronizing signal proper is arranged as shown in FIG. 5.

In the combined signal as shown in FIG. 4, the line synchronizing signal is arranged so that $\frac{1}{4}$, $\frac{1}{2}$ and $\frac{3}{4}$ levels continue for several (A), one (C) and several (B) clock periods, respectively, the $\frac{1}{2}$ level being positioned at the center of the dynamic level range of the picture information signal. Accordingly, even if this line synchronizing signal is clipped, for instance, by non-linear amplification, erroneous line synchronism is not caused. Moreover, in order to obviate the effect of the non-linearity caused in the transmission channel, the sense of the arrangement of different levels is reversed every line synchronizing period, as shown in FIGS. 5(a) and 5(c), respectively, so as to reduce the effect of erroneous levels caused by the non-linearity.

Figure 6:
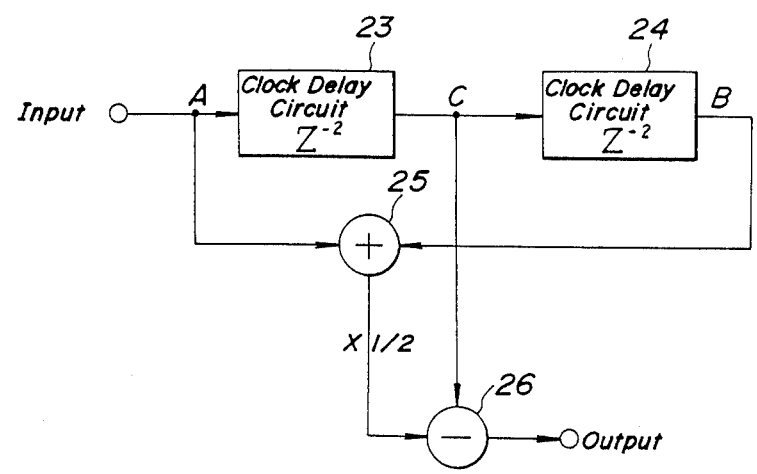
FIG. 6 is a block diagram showing a circuit configuration of a line synchronizing phase detector used in the synchronizing pulse generator of FIG. 3b according to the present invention.

The waveform of the received line synchronizing signal thus arranged is smoothed by the effect of the restricted transmission band width, as shown in FIGS. 5(b) and 5(d), respectively. However, exact line synchronism can be detected by a phase detector arranged as shown in FIG. 6 which can be used in the synchronizing pulse generator 19 of FIG. 3b, regardless of the smoothed signal waveform. In this phase detector, the received line synchronizing signal is applied to a series connection of two clock delay circuits 23 and 24, which each have a delay of two clock periods. Signals A and B, appearing respectively at an input and an output of this series connection are applied to an adder 25. An output of this adder 25 is applied to a subtractor 26 through a $\frac{1}{2}$ multiplier. In addition, a signal C appearing at a mid-point of the series connection is applied to the same subtractor 26 directly. Thus, a resultant signal having a level of $(((A+B)/2)-C)$ is obtained as an output of the phase detector.

In the circuit arrangement as shown in FIG. 6, the waveforms A, B and C appearing at an input, an output and the midpoint of the series connected delay circuit 23, 24 are as shown by waveforms (1) and (4) in FIGS. 7(a) and 7(b) respectively, one-half of the sum of both end waveform A, B, that is, $(A+B)/2$ is as shown by waveforms (2) and (5) in FIGS. 7(a) and 7(b), and a differential output of the subtractor 26 is as shown by waveforms (3) and (6) in FIGS. 7(a) and 7(b), that is, the output of the phase detection. This output waveform of the phase detection is sampled at the leading edge of the reproduced line synchronizing pulse, and, as a result, the coincidence of phase between the received and the reproduced line synchronizing signals occurs at a point on which the sample value becomes zero. Thus, the reproduced line synchronizing pulse is exactly phase-locked on the received line synchronizing signal. On the basis of this exactly phase-locked reproduced line synchronizing pulse, the original high definition color television picture signal can be restored by resampling the received narrow band transmission picture signal at appropriate timings.

Figure 8:
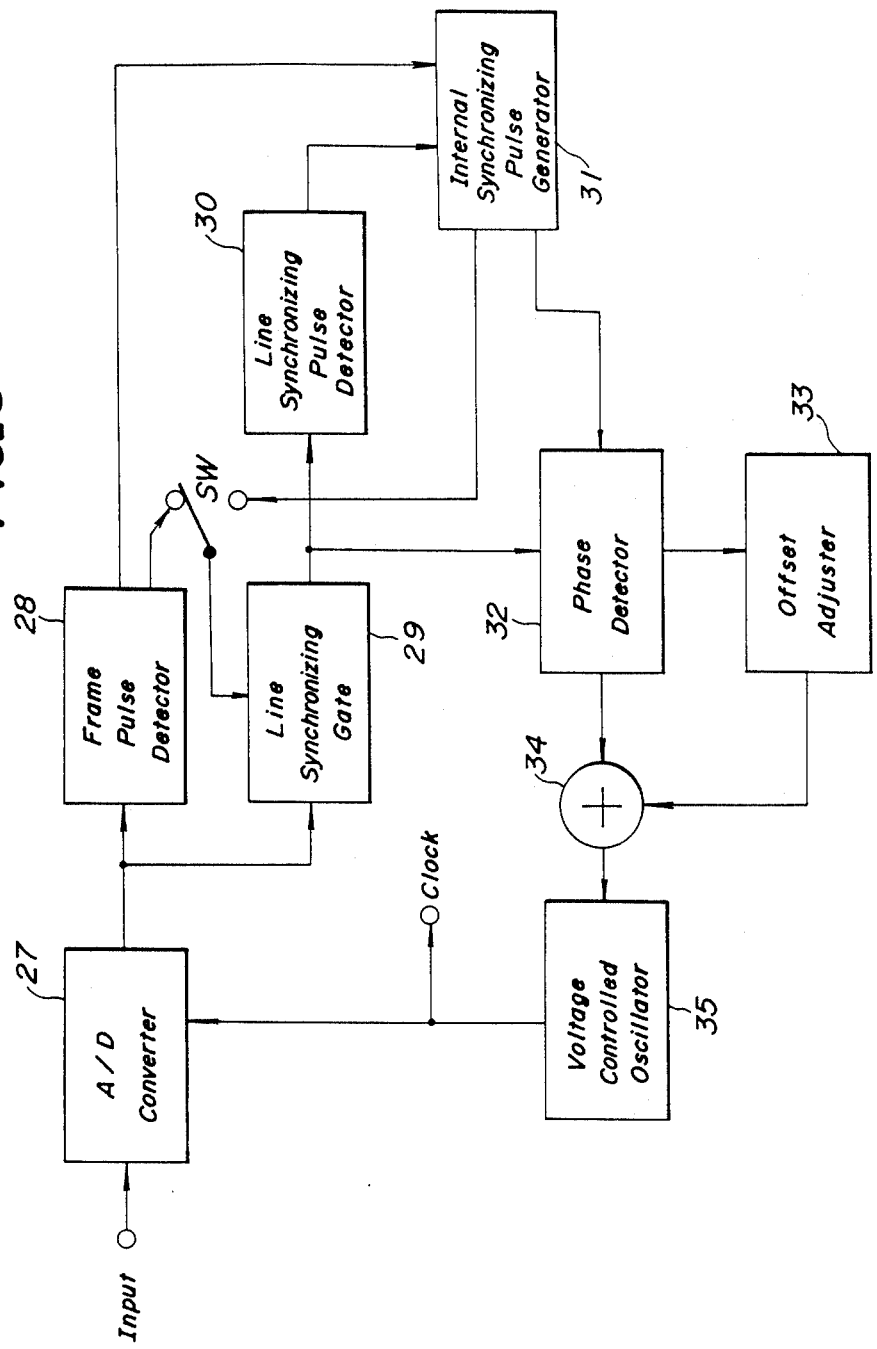
FIG. 8 is a block diagram showing an example of a circuit configuration of a line synchronizing signal phase lock circuit used in the synchronizing pulse generator of FIG. 3b according to the present invention.

An example of a circuit configuration of a phase lock circuit for the line synchronizing signal employing the phase detector on FIG. 6 is shown in FIG. 8. In this circuit configuration, the narrow-band transmission picture signal processed by dot-interlace subsampling is digitized through an analog-to-digital converter 27, a conversion output digital picture signal being applied to a frame detector 28, so as to detect a frame pulse therefrom. The frame pulse thus detected from the received picture signal, and a reproduced frame synchronizing pulse derived from an internal synchronous generator 31, are applied to a line synchronizing gate 29 through a switch SW. A picture signal comprising the frame synchronizing pulse and the line synchronizing signal immediately succeeding thereto, which is gated from the conversion output digital picture signal through the line synchronizing gate 29, is applied to a line synchronizing detector 30, so as to detect the line synchronizing signal. The thus detected line synchronizing signal and the foregoing frame synchronizing pulse are applied to the internal synchronous generator 31, so as to reproduce an internal line synchronizing pulse which is phase-locked on these received synchronizing signals. Thereafter, the internal line synchronizing pulse is applied to a phase detector 32, so as to detect a phase difference between the line synchronizing signal derived from the received picture signal and the internal line synchronizing pulse. The detected phase difference is applied to a voltage controlled oscillator 35 through an adder 34. A pulse sequence derived from the voltage controlled oscillator 35, having an oscillation frequency varied in response to the above phase difference, is applied to the analog-to-digital converter 27 as a driving clock pulse, so as to control the timing of the conversion processing including the sampling of the received picture signal. Therefore, the above pulse sequence is phase-locked on the line synchronizing signal contained in the conversion output digital picture signal, and hence can be taken out as a clock pulse sequence phase-locked on the received digital picture signal.

Consequently, in the circuit configuration as shown in FIG. 8, the precise phase-lock of the clock sequence of the dot-interlace for resampling the received picture signal can be attained by phase-synchronizing the line synchronizing signal contained in the received digital picture signal and the pulse sequence derived from the voltage controlled oscillator with each other through the control loop for feeding-back the phase difference derived from the phase detector 32 to the voltage controlled oscillator 35. However, where a voltage controlled oscillator with crystal control is employed, a fixed residual offset of phase is caused. When the loop control gain is increased such that this residual offset of phase can be neglected, the control loop becomes unstable because of hunting. Therefore, in this situation, the phase difference detected by the phase detector 32 is applied to an offset detector 33, so as to be integrated with a long time constant compared to the frame period. This integrated output is added to the detected phase difference so that this integrated output is suppressed with tolerance, when it exceeds the tolerance. As a result, automatic control of the residual offset can be attained.

Meanwhile, the frame synchronizing the pulse applied to the line synchronizing gate 29 through the switch SW is derived from the internal synchronizing pulse generator 31 in the situation where the control loop is stable. It is directly derived from the frame pulse detector 28 in the situation where the phase difference of the line synchronizing signals is extremely large or where the internally generated frame synchronizing pulse is out of timing, so as to directly apply the frame synchronizing pulse detected from the received picture signal to the line synchronizing gate 29.

As is apparent from the above, according to the present invention, the narrow band transmission picture signal formed of a dot-interlace subsampled original picture signal can be favorably restored into the original picture signal by a resampling process effected on the basis of the system clock synchronously controlled by the internal line synchronizing pulse, which is phase-locked on the transmitted line sychronizing signal having specially formed waveforms capable of maintaining exact synchronism without being effected by non-linear amplification and band-restricted transmission.

As described earlier, in the subsampling transmission system for a high definition color television picture signal, all of the sampled elements required for reconstituting the stationary picture are transmitted every four field periods. Accordingly, with regard to the stationary picture region of the received picture, temporal interpolation is completed by gather all samples transmitted every plural field periods, that is, interframe interpolation is employed.

On the other hand, with regard to the motion picture region of the received picture, spatial interpolation is completed within every field period, that is, in field interpolation is employed.

Accordingly, it is required at the receiving end to selectively employ either one of the above mentioned interpolations after discriminating the stationary and the motion picture regions of the received picture. However, this discrimination of the received picture is accompanied with the following two difficulties.

(1) The data required for the discrimination of the motion of the received picture are not simultaneously transmitted together.

(2) Accordingly, the discrimination of the motion of the received picture cannot be completed, and, as a result, the selective application of the interpolation system adapted to the motion of the received picture cannot be effected.

According to the present invention, an interpolation arrangement for the subsampled picture signal, in which suitable interpolation can be effected in response to the magnitude of the motion of the received picture, is provided. In the interpolation arrangement according to the present invention, the narrow band transmission, picture signal, formed by rearranging the subsampled samples of the picture signal, is separated into high frequency components and low frequency components, at a desired crossover frequency through a suitable low pass filter. Thereafter, the high frequency components having minimum absolute value selected among the above separated high frequency components, and the same delayed by one frame period through a minimum value selection circuit, and the above separated lower frequency components, are added to each other, so as to restore a suitably interpolated picture signal in response to the motion of the received picture.

With regard to the aforesaid difficulty (1), in general, the detection of the motion of the picture is generally effected on the basis of the interframe correlation thereof. However, with regard to the dot-interlace subsampled motion picture signal, the interframe correlation cannot be examined by direct comparison of the specified picture element between adjacent frames. Therefore, the detection of the subsampled motional picture signal cannot help depending on either the interframe comparison between every other frame period or between adjacent frames supplemented by spatial interpolation effected within each frame for interpolating samples skipped by subsampling.

However, interframe correlation based on the interpolation samples cannot complete the detection of the motion of the picture because of the aliasing components contained in the narrow band transmission picture signal arranged by subsampling.

As a result, erroneous discrimination, such as regarding a stationary picture signal as a motion picture signal, is frequently caused by the aliasing components.

On the other hand, in the case of motion detection based on interframe correlation, with regard to the particular scene, for instance, as shown in FIG. 9, in which, although a picture consisting of several samples is moving, each of those samples coincides with one another between every other frame, this motion picture is erroneously discriminated as a stationary picture.

In addition, with regard to the other aforesaid difficulty (2), when detection of the motion is not completed because of the aforesaid reason, or, in the case of a minute motion, which is generated because of, for example, swinging in the deflection system an originally stationary picture is erroneously discriminated as a motion picture. As a result, excessive interpolation is effected and hence the picture becomes unreasonably ambiguous. It is conceivable with regard to this difficulty to prevent the occurrence of the difficulty by reducing the sensitivity for detection of the motion. However, this reduction of the sensitivity of detection of the motion cannot be practically used, because aliasing distortion caused by the subsampling is distinctly noticeable, when conventional temporal interpolation is effected.

According to the present invention, detection of the motion of the picture is effected by interpolation from which the above difficulty is removed. An example of the configuration of the temporal interpolation system operating on the above principle according to the present invention is shown in FIG. 10, signal waveforms at various portions of which are shown in FIGS. 11(a) to 11(f). In this temporal interpolation system, higher frequency components (c) and (d) derived from an input and an output of a frame memory 38, and an average higher frequency component (e) consisting of one-half of a sum of these components (c) and (d) obtained through an adder 39, are applied to a minimum absolute value selection circuit 41, a minimum absolute value higher frequency component (e') selectively obtained from which and a lower frequency component (f) derived from an output end of a low pass filter 36 applied with a subsampled picture signal, are added to each other through an adder 40, so as to obtain a pictur signal (g) supplemented by temporal interpolation. The selection output signal (g) of the minimum absolute value selection circuit 41 is composed of an assembly of partial signals respectively having zero level for the minimum absolute values and hence can be prevented from containing spurious signals such as an edge ghost. Also, ambiguity of a resultant stationary picture signal is prevented.

On the other hand, with regard to a motion picture signal, an adequate ambiguity adapted to the magnitude of the motion is caused, so that spurious signals are avoided in the motion picture signal. In the configuration as shown in FIG. 10, the average high frequency component (e) obtained through the adder 39 is not employed but only the high frequency components (c) and (d) are employed for obtaining a resultant picture signal (g) as mentioned above. However, the average high frequency component (e) consists of a signal component varied in response to the magnitude of the picture motion, so that the resultant picture signal (g) has more favorable picture quality by selecting the minimum absolute value signal component among the group of high frequency components including this average component (e). In the minimum absolute value selection circuit 41, the input signal having the minimum absolute value among plural input signals is produced as the selection output signal.

As is apparent from the above, in the subsampling transmission according to the present invention, the interpolation processing provided with low pass performance adapted to the magnitude of the picture motion can be applied on the picture signal, so that the following remarkable effects can be obtained.

(1) Motion ambiguity is not caused by minute picture motion.

(2) Even if the sensitivity and the accuracy of the detection of the picture motion are low, serious deterioration of the picture quality is not caused.

(3) The deterioration of the picture quality which is caused by subsampling is not visually noticeable.

In the multiplex subsampling transmission system for the high definition color television picture signal, in the situation where the narrow-band transmission picture signal, which is transmitted after the subsampling process, is processed by interpolation based on the adjacent samples in adjacent fields, the received narrow-band transmission picture signal is accompanied with the control signal which has been transmitted together therewith for controlling the interpolation process in response to the magnitude of the picture motion.

However, the information of the picture motion is not necessarily transmitted from the sending end, but can be taken out from the subsampled transmission picture signal on the basis of the discrimination thereof at the receiving end, so as to selectively control the restoring process adapted to the stationary picture and the restoring process adapted to the motion picture as follows.

In the transmission system according to the present invention, the TCI picture signal formed by time axis compression and time divisional multiplexing is processed by the aforesaid dot-interlace subsampling process every four field periods as shown in FIG. 2. Thus, according to this dot-interlace subsampling, a complete picture signal can be transmitted every four frame periods. Consequently, the spatio-temporal frequency region capable of being transmitted for the stationary picture signal is indicated by the range A+B as shown in FIG. 12 and that capable of being transmitted for the motion picture signal is indicated by the range A only as shown by shading in the same.

With regard to the interpolation for the transmitted samples which are thinned by subsampling every field, the interpolation effected for the field, in which the samples indicated by unfilled circles in the sampling pattern as shown in FIG. 2 are transmitted, is processed by employing the samples indicated by filled circles transmitted during the immediately preceding and subsequent frames, as well as by employing the samples indicated by crosses (x) and plus signs (+) transmitted during the immediately preceding and subsequent fields. In this regard, the interpolation thus effected for the stationary picture signal can be performed only through a two-dimensional spatio-temporal filter having a transfer performance corresponding to the range A+B as shown in FIG. 12.

On the other hand, in the motion picture signal, the specified sample is varied every field of every frame, so that interpolation effected by employing samples from the adjacent frame or the adjacent field cannot be performed. Instead, interpolation is effected through a two-dimensional spatio-temporal filter based on the samples transmitted only within every field. In this connection, with regard to the motion picture signal, the spatio-temporal frequency region capable of being transmitted is only the range A as shown in FIG. 12, so that, although the above interpolation is effected, picture resolution is reduced. However, this reduction of resolution of the motion picture does not visually deteriorate the picture quality at all.

As mentioned above, in the transmission and reproduction system according to the present invention, with regard to the motion picture, interpolation can be performed at the receiving end on the basis of the interframe correlation detected by the interframe difference between adjacent two frames in a receiving end arrangement as shown in FIG. 13.

In the receiving end arrangement configured as shown in FIG. 13, under control of the line synchronizing signal transmitted together with the narrow-band transmission picture signal, the received narrow-band picture signal is successively delayed by one field period through four field memories 42-1 to 42-4 connected in series, so as to obtain the situation where four groups of samples arranged in the subsampling pattern as shown in FIG. 2 are held in those series-connected four field memories 42-1 to 42-4 respectively at a certain instant. In this connection, each of the series connected four field memories 42-1 to 42-4 holds only samples transmitted every field period, so that the memory capacity thereof can be one fourth of that at the sending end. In this situation, picture signals derived from both ends of the series connection of those four field memories 42-1 to 42-4 apart from each other by two frames periods are applied to a motion magnitude detector 43, which can be similar to the aforementioned U.S. patent, so as to discriminate the existence and the magnitude of the significant picture motion in response to the inter-two-frame correlation based on the magnitude of the inter-two-frame picture difference. The detection output signal thereof is applied to two mixers 46 and 49 in parallel, so as to mix individual interpolation signals respectively prepared for the stationary picture signal and the motion picture signal, as mentioned later, with each other at a ratio varied in response to the magnitude of the picture motion detected on the basis of the inter-two-frame correlation.

The mixer 46 is supplied with the interpolation signal for the stationary picture signal formed by switching at every dot period through a switch SW one-half of the sum of the adder 45 supplied with the signals derived from both ends of the series connection of the four field memories 42-1 to 42-4, and a one-frame delayed picture signal derived from the midpoint of the series connection of the series connected field memories 42-1 to 42-4, together with the interpolation signal of the motion picture signal formed through a two-dimensional interpolation filter 44 which is applied with the same one-field delayed picture signal, the mutual inerpolation between samples respectively indicated by filled circles and unfilled circles in the subsampling pattern as shown in FIG. 2, is effected by interframe interpolation, while with regard to the motion picture signal, the same is effected by in frame interpolation.

Also, the mixer 49 is supplied with the interpolation signal for the stationary picture signal which is ultimately derived from a two-dimensional temporal interpolation filter 47 supplied with the mixer output signal of the mixer 46 and the one field and three field delayed picture signals respectively derived from the outputs of the field memories 42-1 and 42-3, and the interpolation signal for the motional picture signal derived from an interpolation filter 48 supplied with the mixed output signal of the mixer 46. As a result, interpolation of the sample positions indicated by the crosses (x) in the subsampling pattern as shown in FIG. 2 is performed on the basis of the samples indicated by samples indicated by filled and unfilled circles and squares, respectively, so as to obtain the original picture signal completely supplemented. In this regard, as mentioned earlier, the temporal interpolation arrangement of FIG. 10 is particularly well suited for responding to minute picture motion and for eliminating aliasing components resulting from temporal interpolation. Therefore, the circuit of FIG. 10 may advantageously be inserted between the temporal interpolation filter 47 and mixer 49.

In the multiplex subsampling transmission system according to the present invention, separation of the picture signal into the motion picture region and the stationary picture region is generally required, and hence spatial interpolation is used for the former and temporal interpolation is used for the latter. In this connection, it is effective for the detection of picture motion to detect the absolute value of the difference of the picture signal between adjacent frames thereof and hence to regard the picture region indicating the significant difference as the motion picture region. However, in the dot-interlace subsampling transmission system, it is difficult to accurately detect the motion picture region at the receiving end. This is because of the following.

In the situation where, for instance, the subsampling of the picture signal is effected every two frame periods and every other sample is transmitted in each frame or in each field, it is difficult to directly compare the same sample between two frames separated from each other by one frame period at the receiving end. Thus, it is usual in this transmission system to employ the inter-two-frame differential picture signal obtained between every other frame for the detection of the motion picture region. However, in the example of the motion picture signal as shown in FIG. 9, the inter-two-frame difference as shown by arrow marks cannot be discriminated as a motion picture region.

Accordingly, in the multiplex subsampling transmission and motion compensated reproduction system according to the present invention, when the motion information of the picture is not transmitted from the sending end, the motion picture region can be accurately detected by skillfully employing the inter-one-frame difference by combining the detection of motion information at both the sending and receiving ends as follows.

The TCI picture signal is subsampled at an adequate interval at every plural frame periods, so as to obtain plural kinds of subsampled narrow-band transmission picture signals. In this situation at the sending end, the picture expressed by the TCI picture signal is divided into plural blocks. In each of those blocks, the narrow-band transmission picture signals are multiplexed with a selecto-discrimination signal for selecting either inter-two-frame discrimination or parallel discrimination using both inter-two-frame and inter-one-frame difference for discriminating the pictorial motion information employed for the picture signal processing at the receiving end. The inter-two-frame pictorial difference only is used for motion discrimination in inter-two-frame discrimination, while both inter-two-frame and inter-one-frame pictorial differences are used in parallel for motion discrimination in parallel discrimination.

At the receiving end, which discrimination should be employed is decided according to the selecto-discrimination signal separated from the received narrow-band transmission picture signals. The information of the picture motion expressed thereby is detected in each block on the basis of the selectively employed discrimination. The skipped samples of the received narrow-band transmission picture signals are supplemented in each block by the detected information of the picture motion, so as to restore the original TCI picture signal.

Figure 15:
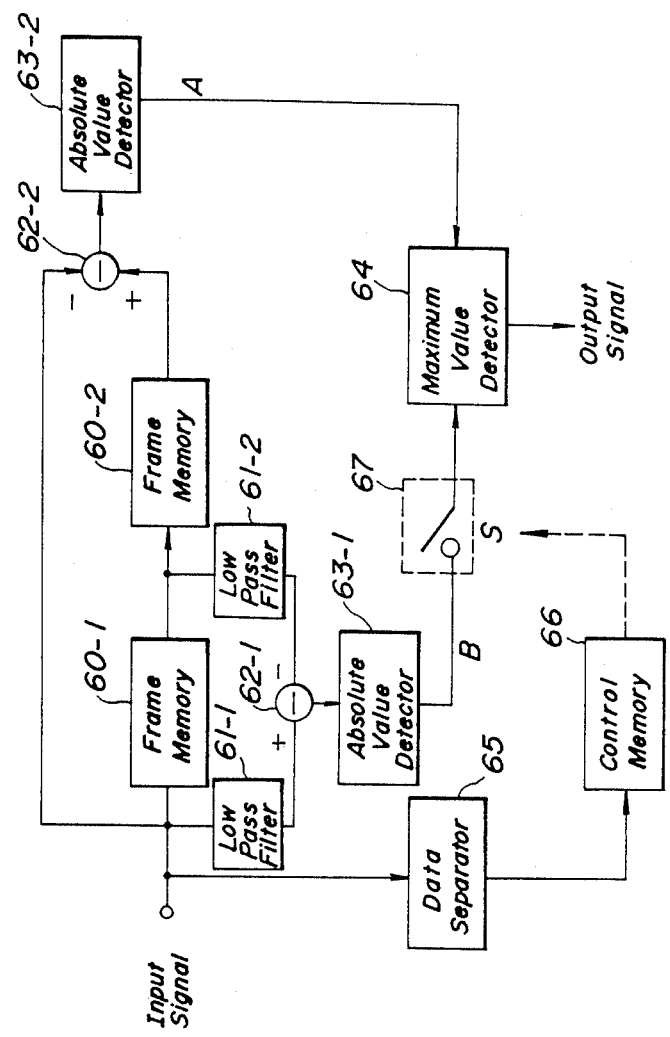
FIG. 15 is a block diagram showing another example of a motion magnitude detector which can be used at the receiving end shown in FIG. 13 of the present invention.

With regard to the above-mentioned picture signal processing, the configuration of the motion detection at the sending end arrangement is shown in FIG. 14, while that of the receiving end arrangement is shown in FIG. 15. FIG. 14 can be used in the motion detector 4 of FIG. 3a, or a motion magnitude detector 68 as shown in FIG. 16 discussed below. FIG. 15 can be used in place of the motion magnitude detector 43 of FIG. 13.

In the sending end arrangement, the input TCI picture signal is converted into three kinds of picture signals A, B and C as shown in FIG. 14. The picture signals A and B are absolute values obtained through absolute value detectors 57-A and 57-B respectively of the inter-two-frame and the inter-one frame difference picture signals derived from a series-connection of frame memories 50-1 and 50-2. The picture signal C is an absolute obtained through an absolute value detector 57-C of a present frame differential picture signal derived from a subtractor 56 supplied with a quasi present frame picture signal $C_1$ substantially equal to a low-pass-filtered TCI picture signal, derived from an interpolation filter 54, for softly restoring skipped samples of an output signal $C_2$ of a subsampling encoder 53 applied with the input TCI picture signal and a lower frequency range picture signal $C_3$ derived from a low pass filter 55 directly supplied with the input TCI picture signal. This present frame difference picture signal $C_1$ is ordinarily not large, but becomes unusually large when the original TCI signal has a larger higher frequency range picture signal. This is because an aliasing signal component falls in the lower frequency range and hence the difference between the picture signals $C_1$ and $C_3$ becomes unusually large. Therefore, one of the aforesaid conventional difficulties can be removed by transmitting the above selecto-discriminating signal to the receiving end, which sigal can be derived from a logic circuit 58 applied with picture signals A, B and C.

In this logic circuit 58, picture signals A, B and C are individually compared with respectively predetermined standard values, so as to be converted to logic values of 1 or 0 in response to the situation where the signals are larger or smaller than these respective standard values. These logic values are processed under a logical calculation as the following conditions are satisfied.

(1) Whenever both of the logic values A and B are 1, a calculation output is 1.

(2) When both of the logic values A and C are 1 and the logic value B is zero, the calculation output is 1.

(3) When the logic value A is 0 and both of logic values B and C are 1, the calculation output is 0.

(4) On the other remaining conditions, the calculation output is always 0.

Here, A=1 indicates the situation where the inter-two-frame difference picture signal has a significant difference, while B=1 indicates the situation where the inter-one-frame difference picture signal has a significant difference. On the other hand, C=1 corresponds to the situation where the picture signal C is extremely large and hence the original picture signal is a stationary picture signal containing a large amount of higher frequency components.

The above calculation output is used as the selecto-discrimination signal of 1 or 0, which is transmitted under multiplexing with the narrow-band transmission picture signal is each of blocks dividing the original picture as mentioned above. In this situation, it is desirable to divide the original picture into blocks as small as possible. However, in practice, for instance, one block can be composed of 32 picture elements on each of 16 lines. This scale of one block is enough to be small so that an unnaturally restored picture is not noticeable even if both motion and stationary regions appear in the same picture.

In the receiving end arrangement as shown in FIG. 15, the inter-two-frame difference picture signal A and the quasi inter-one-frame difference picture signal B are prepared from the received narrow-band transmission picture signal through the series-connection of frame memories 61-1 and 61-2. The selecto-discrimination signal is separated from the received narrow-band transmission picture signal through a data separator 6, so as to control a change-over switch 68 through a controlling memory 66 at timing coincident to the received narrow-band transmission picture signal. When the logic value of the transmitted selectodiscriminatio signal is 1, the switch 67 is closed, while the former is 0, the latter is opened. When the switch 67 is closed, the picture signal A and C are compared wtih each other, and, as a result, the larger signal is selected through a maximum value detector 64. When the switch 67 is opened, the picture signal A is always produced. The selecto-discrimination signal derived from the arrangement as shown in FIG. 15 is used for restoring the narrow-band transmission picture signal either by spatial interpolation or by temporal interpolation of skipped samples, so as to obtain the original TCI picture signal.

In the above exemplified arrangement, the picture signal is subsampled every two frames and every other sampled data is transmitted within either one frame or one field. However, the present invention is not restricted to this example, and the number n of frame periods in which the subsampling completes one round can be arbitrary, for instance, 2 or 3, as long as n is greater than or equal to 2.

In the situation where the one-round subsampling is effected every n frames, the inter-n-frame differential picture signal corresponds to the above inter-two-frame difference picture signal every two field periods, and hence the selecto-discrimination is performed by comparison between the inter-n-frame difference and the inter-one frame difference picture signals. Namely, the (n+1)th frame corresponds to the present frame, while the inter-n-frame difference is the difference between the 1st frame and the (n+1)th frame, and the inter-one-frame difference is the difference between the nth frame and the (n+1)th frame.

Generally speaking with regard to the above processing, in the subsampling transmission system every n frame periods, the control signal for selecting the discriminating which should be employed at the receiving end among the inter-n-frame difference discrimination effected by using only the inter-n-frame differential picture signal as the discriminating information and the inter-one-frame difference discrimination effected by using the inter-one-frame differential picture signal as the discrimnating information is prepared at the sending end.

The larger the number of frames for one-round discrimination, the narrower the transmission bandwith. However, the number n of frames is 4 at the most in practice, because the object of the discrimination is the restoration of a high definition color televison picture signal.

In this regard, the allotment of the logic values 1 and 0 as shown by the above example of one round of two frame periods can be reversed, in response to the situation where the switch S is opened or closed as shown in FIG. 15.

As is apparent from the above, according to the present invention, the original high definition color television picture signal can be restored from the received narrow band transmission signal, formed by subsampling the original picture signal, more faithfully than by the conventional transmission system on account of supplementing of the skipped samples on the basis of either spatial interpolation or temporal interpolation. Particularly, in the situation where faithful restoration of the motion picture signal as shown in FIG. 9 cannot be performed because of the erroneous discrimination as the stationary picture signal, the original TCI picture signal can be restored on the basis of accurate discrimination.

In the transmission and reproduction system according to the present invention, the TCI picture signal formed by time-division compression multiplexing is subsampled by the dot interlace every four field periods as shown in FIG. 2. According to this subsampling, one-frame picture can be transmitted every four field periods, namely, at every two frame periods, However, the spatio-temporal frequency range as shown by the ranges A plus B in FIG. 12 can be transmitted for the stationary picture signal, while that as shown by the range A shaded in FIG. 12 can be transmitted for the motion picture signal.

According to the present invention, in order to avoid the aforesaid generation of the aliasing component based on the subsampling frequency in the supplementary interpolation at the receiving end, configured as shown in FIG. 13, the sending end arrangement is configured as shown in FIG. 16. In the configuration as shown in FIG. 16, a two-dimensional low pass filter 70, for passing the spatio-temporal frequency range A+B as shown in FIG. 12 corresponding to the two-dimensional temporal interpolation filter 47 at the receiving end, is provided for the stationary picture signal, while a two-dimensional pass filter 69, for passing the spatio-temporal frequency range A as shown in FIG. 12 corresponding to the two-dimensional spatial interpolation filter 44 and the spatial interpolation filter 48 at the receiving end, is provided for the motion picture signal. In addition, inter-two-frame correlation is discriminated on the basis of an inter-two-frame difference signal obtained through a motion magnitude detector 68 supplied with the picture signals respectively derived from both ends of the series connection of four field memories 67-1 to 67-4 corresponding to series connected field memories at the receiving end. The mixing ratio through a mixer 71 of the outputs of the above mentioned two-dimensional low-pass filters 69 and 70 is varied in response to the magnitude of the picture motion, which is detected on the basis of the above-mentioned inter-two-frame correlation. In this connection, the two-dimensional low pass filter 69 is supplied with the one-frame delayed picture signal derived from the field memory 67-2, while the two-dimensional low pass filter 70 is supplied with the one-field delayed, the one-frame delayed and the three-field delayed picture signal, respectively, derived from the field memories 67-1 to 67-3.

Further, in this connection, the detection of the picture motion through the motion magnitude detector 68 is effected on the basis of the absolute value of the low-pass filtered inter-two-frame differential picture signal which is elongated in the time-axis direction through the temporal filter composed of field memories, stabilized by the insensitivity through the low pass filters against erroneous detection of the inter-two-frame difference and minute picture motion.

In addition, together with the detection of the picture motion which is based on the discrimination of the inter-two-frame correlation in response to the above-mentioned inter-two-frame differential picture signal, detection of the magnitude of the picture motion is based on the discrimination of the in frame correlation in response to the differential signal between adjacent two field periods. Hence, the detection of the picture motion based on the inter-two-frame correlation is employed, only when the magnitude of the picture motion detected on the basis of the in frame correlation exceeds the predetermined level.

As mentioned earlier, according to the previously effected restriction of the higher frequency range of the motion picture signal, generation of the aliasing component can be prevented even through interpolation of the subsampled motion picture region. Meanwhile, all of the information in the higher frequency range can be transmitted for the stationary picture region.

Additionally speaking with regard to the transmission and reproduction system according to the present invention, the information of the picture motion, for instance, comprising the magnitude thereof, the motion vector and the like, or, the special line synchronizing signal, is multiplexed with the subsampled narrow band transmission picture signal as the control signal for restoration at the receiving end. Thus, picture signal processing based on interpolation respectively adapted to the stationary picture signal, the quasi-stationary picture signal and the motion picture signal can be effected on the basis of the control signal separated from the received narrow band transmission picture signal. Moreover, according to the combination of the above suitable interpolation effected only at the receiving end and the previous restriction of the bandwidth required respectively for the stationary picture region and the motion picture region at the sending end, generation of the aliasing component unavoidably caused by the dot-interlace subsampling can be suppressed and hence deterioration of the picture quality based on the aliasing distortion can be prevented.

We claim:

1. A divisionally time-compressed subsample transmission and motion compensated reproduction system for a high definition color television signal, comprising:
   a sending end including:
      means for individually compressing time axes of luminance and chrominance signal components of a high definition color television picture signal by sampling said high definition color television picture signal at a clock rate phase-locked on a line synchronizing signal of said high definition color television picture signal whereby said time axes are compressed,
      means for time-divisionally multiplexing the compressed time axes of said luminance and chrominance signal components, so as to obtain a time-divisionally compressed and multiplexed picture signal, means for subsampling said time-divisionally compressed and multiplexed picture signal during predetermined plural fields, so as to obtain a picture signal conditioned for narrow band transmission, and
      means for forming a control signal including a line synchronizing control signal having a polarity the same as a picture information signal of said high definition color television picture signal, so as to allow reproduction of a reproduced line synchronizing signal phase-locked on the subsampled picture signal,
      means for transmitting said picture signal conditioned for narrow band transmission and said control signal to a receiving end;
   motion information detector means, provided at at least one of the sending end and receiving end, for generating a picture motion information signal detected from said time-divisionally compressed multiplexed picture signal;
   said receiving end comprising:
      means for receiving said picture signal condition for narrow-band transmission,
      means for separating said control signal from said picture signal conditioned for narrow-band transmission, means for supplementing said picture signal conditioned for narrow-band transmission by inserting samples of luminance and chrominance signal components which were skipped by said means for subsampling at the sending end, so as to restore said picture signal condition for narrow band transmissioned into said time-divisionally compressed and multiplexed picture signal under control of said control signal separated from said picture signal conditioned for narrow-band transmission and under control of said picture motion information signal, and
      means for respectively expanding the time axes of said luminance and said chrominance signal components separated from the restored time-divisionally compressed and multiplexed picture signal, so as to reconstruct said luminance and chrominance signal components of said high definition color television picture signal.

2. A divisionally time compressed subsample transmission and motion compensated reproduction system for a high definition color television picture signal as recited in claim 1, wherein said line synchronizing control signal comprises a sequence of stepwise signal levels of the same polarity as said picture information signal, a sense of said stepwise signal levels being reversed at every other line synchronizing period, so as to obtain a reproduced line synchronizing signal phase-locked on an average of said transmitted line synchronizing control signal over plural line synchronizing periods.

3. A divisionally time-compressed subsample transmission and motion-compensated reproduction system for a high definition color television picture signal as recited in claim 1, wherein said means for supplementing further comprises:
   means for separating a low frequency component and a high frequency component of said picture signal conditioned for narrow band transmission from each other;
   means for selecting a frequency component having a minimum absolute value among at least said high frequency component and a one-frame-period delayed high frequency component; and
   means for adding said low frequency component and said frequency having a minimum absolute value, so as to restore said picture signal conditions for narrow-band transmission into said time-divisionally compressed and multiplexed picture signal.

4. A divisionally time-compressed subsample transmission and motion-compensated reproduction system for a high definition color television picture signal as recited in claim 1, wherein said means for supplementing comprises:
   field delay means, including a series of a plurality of field memories, for successively delaying said picture signal conditioned for narrow-band transmission by one field period of each field memory;
   means for detecting a magnitude of motion of a picture expressed by said picture signal conditions for narrow-band transmission by calculating a difference between an input and an output of said series of plurality of field memories under control of said control signal; and
   means for two-dimensional interpolation filtering motion picture contents and stationary picture contents of said picture signal conditioned for narrow-band transmission, respectively, so as to affect supplementing of said picture signal conditioned for narrow-band transmission by adding respective outputs of said means for detecting said mangitude to each other at a ratio varied in proportion of said magnitude of said motion.

5. A divisionally time-compressed subsample transmission and motion-compensated reproduction system for a high definition color television picture signal as recited in claim 2, wherein said receiving end further includes means for reproducing said line synchronizing signal from said line synchronizing control signal, comprising:
   delay means including a series connection of two clock delay circuits successively delaying said line synchronizing control signal by plural clocks periods, respectively;

adder means for adding signals derived from an input and an output of said series connection of two clock delay circuits to each other; and subtractor means for subtracting a signal derived from a mid-connection point of said series connection of two clock delay circuits from one half of an output signal of said adder means; and whereby, exact phase coincidence occurs between said line synchronizing signal and said reproduced line synchronizing signal at point of zero crossing of an output signal of said subtractor means sampled by a leading edge of said reproduced line synchronizing signal.

6. A divisionally time-compressed subsample transmission and motion-compensated reproduction system for a high definition color television picture signal as recited in claim 1, wherein said sending end further comprises:

means for two-dimensionally low-pass-filtering said time-divisionally compressed and multiplexed picture signal, so as to suppress generation of aliasing components during subsampling of said time-divisionally compressed and multiplexed picture signal, in response to a motion content of said high definition color television picture signal, said motion content detected from interframe differences of said time-divisionally compressed and multiplexed picture signal.

7. A divisionally time-compressed subsample transmission and motion-compensated reproduction system for a high definition color television picture signal as recited in claim 6, wherein said means for two-dimensionally lwo-pass-filtering said time-divisionally compressed and multiplexed picture signal comprises:

delay means including a series of a plurality field memories for successively delaying said time-divisionally compressed and multiplexed picture signal by one field period for each memory;

means for detecting a magnitude of motion content of said time-divisionally compressed and multiplexed picture signal from a difference between signals derived from an input and an output of said series of a plurality of field memories; and means for two-dimensionally low-pass-filtering motion picture content and stationary picture content of said time-divisionally compressed and multiplexed picture signal, respectively, derived from intermediate connection points of said series of a plurality of field memories, whereby aliasing components of the time-divisionally compressed and multiplexed picture signal are suppressed by adding respective motion picture content and stationary picture content to each other at a ratio varied in proportion to said motion picture content.

8. A divisionally time-compressed subsample transmission and motion-compensated reproduction system for a high definition color television picture signal as recited in claim 1, wherein said means for forming said control signal comprises:

first and second series connected frame memories for successively delaying said time-divisionally compressed and mulitplexed picture signal by one frame period, per each memory;

a subsampling encoder for sampling said time-divisionally compressed and multiplexed picture signal and an interpolation circuit for supplementing a sampled output signal of said subsampling encoder by low-pass filtering, said subsampling encoder and said interpolation circuit being connected in series;

a low pass filter for low-pass-filtering said time-divisionally compressed and multiplexed picture signal;

a first absolute value detector for detecting an absolute value of a difference between signal derived from an input and an ouput of said first frame memory;

a second absolute value detector for detecting an absolute value of a difference between signals derived from an input and an output of a series connection of said first and second frame memories;

a third absolute value detector for detecting an absolute value of a difference between respective outputs of said low pass filter and said series connection of the subsampling encoder and the interpolation circuit; and a logic circuit for obtaining a motion control portion of said control signal by comparing said absolute values derived from said first, second and third absolute value detectors with respective reference values.

9. A divisionally time-compressed subsample transmission and motion-compensated reproduction system for a high definition color television picture signal as recited in claim 8, wherein said means for supplementing comprises;

third and fourth series connected frame memories successively delaying said picture signal provided for narrow band transmission by one frame period per each memory;

a fourth absolute value detector for detecting an absolute value of a difference between signals derived from an input and an ouput of said third frame memory;

a fifth absolute value detector for detecting an absolute value of a difference between signals derived from an input and an output of said third and fourth series connected frame memories; and a maximum value detector for detecting a maximum value of respective absolute values derived from said fourth and fifth absolute value detectors through a switch controlled by said motion control portion of said control signal, so as to affect the replacement of skipped samples either through spatial interpolation or through temporal interpolation in response to a maximum value derived from said maximum value detector.

* * * * *